US009396044B2

(12) United States Patent
Sundstrom et al.

(10) Patent No.: US 9,396,044 B2
(45) Date of Patent: Jul. 19, 2016

(54) MEMORY EFFICIENT THREAD-LEVEL SPECULATION

(71) Applicant: SONY CORPORATION, Tokyo (JP)

(72) Inventors: Henrik Sundstrom, Sodra Sandby (SE); Anders Isberg, Akarp (SE); Hakan Grahn, Karlskrona (SE); Jan Kasper Martinsen, Oslo (NO)

(73) Assignee: Sony Corporation, Tokyo (JP)

( * ) Notice: Subject to any disclaimer, the term of this patent is extended or adjusted under 35 U.S.C. 154(b) by 96 days.

(21) Appl. No.: 14/262,033

(22) Filed: Apr. 25, 2014

(65) Prior Publication Data
US 2015/0309848 A1    Oct. 29, 2015

(51) Int. Cl.
G06F 9/46       (2006.01)
G06F 9/52       (2006.01)
G06F 9/30       (2006.01)
G06F 11/14      (2006.01)
G06F 9/48       (2006.01)

(52) U.S. Cl.
CPC .............. *G06F 9/528* (2013.01); *G06F 9/3009* (2013.01); *G06F 9/461* (2013.01); *G06F 9/4843* (2013.01); *G06F 11/1407* (2013.01); *G06F 11/1484* (2013.01); *G06F 9/466* (2013.01); *G06F 2201/815* (2013.01)

(58) Field of Classification Search
None
See application file for complete search history.

(56) References Cited

U.S. PATENT DOCUMENTS

| 5,574,854 | A  | * | 11/1996 | Blake et al. ................ 714/28 |
| 6,079,032 | A  | * | 6/2000 | Peri ......................... 714/38.13 |
| 6,253,225 | B1 | * | 6/2001 | Nakahara et al. ............ 718/100 |
| 8,001,595 | B1 | * | 8/2011 | Spurlock et al. ............... 726/22 |
| 8,893,099 | B1 | * | 11/2014 | Leung ........................... 717/151 |
| 2004/0122815 | A1 | * | 6/2004 | Wang et al. ...................... 707/4 |
| 2004/0230962 | A1 | * | 11/2004 | Ogasawara .................. 717/151 |
| 2004/0261051 | A1 | * | 12/2004 | Okamoto ....................... 716/18 |
| 2005/0034109 | A1 | * | 2/2005 | Hamilton et al. ............ 717/140 |
| 2005/0081207 | A1 | * | 4/2005 | Hoflehner et al. ............ 718/100 |
| 2005/0086647 | A1 | * | 4/2005 | Ito et al. ....................... 717/132 |
| 2006/0004827 | A1 | * | 1/2006 | Stuart ........................... 707/102 |
| 2007/0011684 | A1 | * | 1/2007 | Du et al. ....................... 718/105 |
| 2008/0181609 | A1 | * | 7/2008 | Yi et al. ......................... 398/58 |
| 2010/0223598 | A1 | * | 9/2010 | Levine et al. ................ 717/128 |
| 2011/0264898 | A1 | * | 10/2011 | Chaudhry et al. ............ 712/228 |
| 2012/0304172 | A1 | * | 11/2012 | Greifeneder et al. ............ 718/1 |
| 2014/0156973 | A1 | * | 6/2014 | Suzuki ......................... 712/205 |

(Continued)

OTHER PUBLICATIONS

International Search Report and Written Opinion issued for International Application No. PCT/IB2014/065554, mailed on Feb. 16, 2015, 5 pages.

(Continued)

*Primary Examiner* — Emerson Puente
*Assistant Examiner* — Mehran Kamran
(74) *Attorney, Agent, or Firm* — Harrity & Harrity, LLP

(57) ABSTRACT

A processor device executes program code in one or more threads. The processor device detects a call of a function in one of the threads and executes the function in a further thread. Further, the processor device performs a selection between saving a state of the processor device when starting execution of the function in the further thread and not saving the state of the processor device when starting execution of the function in the further thread. In response to a conflict related to the execution of the function in the further thread, the processor device may perform a rollback to a last saved state of the processor device and execute the function in the thread in which it was called.

18 Claims, 3 Drawing Sheets

(56) References Cited

U.S. PATENT DOCUMENTS

2014/0156977 A1* 6/2014 Dechene et al. ............. 712/239
2015/0046912 A1* 2/2015 Vick et al. .................... 717/152
2015/0234664 A1* 8/2015 Kim et al. ......................... 718/1

OTHER PUBLICATIONS

Martinsen et al., "The Effect of Thread-Level Speculation on a Set of Well-known Web Applications", 4th Swedish Workshop on Multi-Core computing (MCC-2011), Linkoping, Sweden, Nov. 23, 2011, pp. 57-62, XP055166079.

Martinsen et al., "Using Speculation to Enhance JavaScript Performance in Web Applications", IEEE Internet Computing, IEEE Service Center, New York, NY, Institute of Electrical and Electronics Engineers, US, vol. 17, No. 2, Mar. 1, 2013, pp. 10-19, XP011498341.

Warg et al., "Improving Speculative Thread-Level Parallelism Through Module Run-Length Prediction", Parallel and Distributed Processing Symposium, 2003, International Proceedings Apr. 22-26, 2003, Piscataway, NJ, USA, IEEE, Apr. 22, 2003, pp. 12-19, XP010645297.

* cited by examiner

MEMORY EFFICIENT THREAD-LEVEL SPECULATION

FIELD OF THE INVENTION

The present invention relates to methods of executing program code and to corresponding devices.

BACKGROUND OF THE INVENTION

A current trend in computer technology is that computer systems are equipped with parallel processing capabilities, such as multiple processor cores. Further, applications are moved to the Internet, e.g., as web applications. In a way, web applications may be regarded as a multi-system platform for new applications, because they allow for executing applications in various kinds of web browsers, which in turn may run on various kinds of computing systems.

The usage of parallel processing capabilities however raises several issues. In particular, efficient utilization of parallel processing capabilities may require specifically designed program code, and significant effort may be required to provide such "parallelized" program code. Exemplary issues which may arise when developing parallelized program code are decomposition of a problem into parallel parts, scaling of a problem with the available parallel processing capabilities (for example: "If the problem can be handled with a certain speed on four processor cores, will the performance double when eight processor cores are available?"), or debugging of the parallelized program code.

A known way of dealing with such issues in a transparent manner for program code developers is a concept referred to as "Thread-Level Speculation". In the case of Thread-Level Speculation, a function which is called during execution of the program code is executed in a new thread, e.g., running on a separate processor core. If this execution of the function in the new thread causes a conflict, a rollback is performed and the function is then executed in an existing thread, typically the thread from which the function was called.

However, the need to be able to perform a rollback whenever a function is called may result in significant memory usage because the state of the system when starting execution of the function in the new thread needs to be stored.

Accordingly, there is a need for techniques which allow for efficiently executing program code in multiple threads.

SUMMARY OF THE INVENTION

According to an embodiment, a method is provided. According to the method a processor device executes program code in one or more threads. The program code may be a script-based web application, e.g., based on JavaScript. The processor device detects a call of a function in one of the threads and executes the function in a further thread. Further, the processor device performs a selection between saving a state of the processor device when starting execution of the function in the further thread and not saving the state of the processor device when starting execution of the function in the further thread. In response to a conflict related to the execution of the function in the further thread, the processor device may perform a rollback to a last saved state of the processor device and execute the function in the thread in which it was called.

According to an embodiment, the selection depends on a number of performed rollbacks. Further, the selection may depend on a number of functions which are currently being executed by the processor device. For example, in response to the number of functions being smaller than a threshold value, e.g., three, the processor device may select the option of saving the state, and in response to the number of functions being equal to or larger than the threshold value the processor device may select the option of not saving the state.

According to an embodiment, the selection depends on a depth of the function. In particular, the selection may depend on a comparison of the depth of the function to a depth of a further function which is currently being executed. For example, the processor device may determine a plurality of functions which are currently being executed by the processor device and create a sorted list of depths of this plurality of functions. The processor device may then select the depth of the further function depending on its position in the list. The position in the list may depend on a number of performed rollbacks. For example, this dependency may be such that, as the number of performed rollbacks increases, the position in the list may move towards an end of the list which corresponds to higher depths. In response to the depth of the function being smaller than the depth of the further function, the processor device may select the option of the state. In response to the depth of the function being equal to or larger than the depth of the further function, the processor device may select the option of not saving of the state.

According to a further embodiment, an apparatus is provided. The apparatus includes a memory which is operable to store program code. Further, the apparatus includes a processor device which is operable to execute the program code in one or more threads. For example, the processor device may include a processor with multiple cores or even multiple single core or multi-core processors. Further, the processor device may support execution of multiple threads by a single processor core. The program code may be a script-based web application, e.g., based on JavaScript. The processor device is configured to detect a call of a function in one of the threads and execute the function in a further thread. Further, the processor device is configured to perform a selection between saving a state of the processor device when starting execution of the function in the further thread and not saving the state of the processor device when starting execution of the function in the further thread. According to an embodiment, the processor device may also be configured to detect a conflict related to said execution of the function in the further thread and, in response to such conflict, perform a rollback to a last saved state of the processor device and execute the function in the thread in which it was called.

According to an embodiment, the selection depends on a number of performed rollbacks. Further, the selection may depend on a number of functions which are currently being executed by the processor device. For example, in response to the number of functions being smaller than a threshold value, e.g., three, the processor device may select the option of saving the state, and in response to the number of functions being equal to or larger than the threshold value the processor device may select the option of not saving the state.

According to an embodiment, the selection depends on a depth of the function. In particular, the selection may depend on a comparison of the depth of the function to a depth of a further function which is currently being executed. For example, the processor device may determine a plurality of functions which are currently being executed by the processor device and create a sorted list of depths of this plurality of functions. The processor device may then select the depth of the further function depending on its position in the list. The position in the list may depend on a number of performed rollbacks. For example, this dependency may be such that, as the number of performed rollbacks increases, the position in the list may move towards an end of the list which corresponds to higher depths. In response to the depth of the function being smaller than the depth of the further function, the processor device may select the option of the state. In response to the depth of the function being equal to or larger than the depth of the further function, the processor device may select the option of not saving of the state.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to execution of program code by a processor device with parallel processing capabilities. The processor device may for example be a multi-core processor, i.e., a processor equipped with multiple program cores which support parallel execution of multiple threads, e.g., each thread on a corresponding processor core. Further, the processor device could include multiple single core or multi-core processors. Still further, the processor device could support parallel execution of multiple threads by a single processor core, e.g., using the Hyper-Threading technology as provided for certain processors manufactured by Intel Corporation.

The processor device may be part of various kinds of computer systems, e.g., a processor module of a mobile device such as a smart phone or tablet computer. However, the processor device could also be utilized in other kinds of apparatuses.

Figure 1:
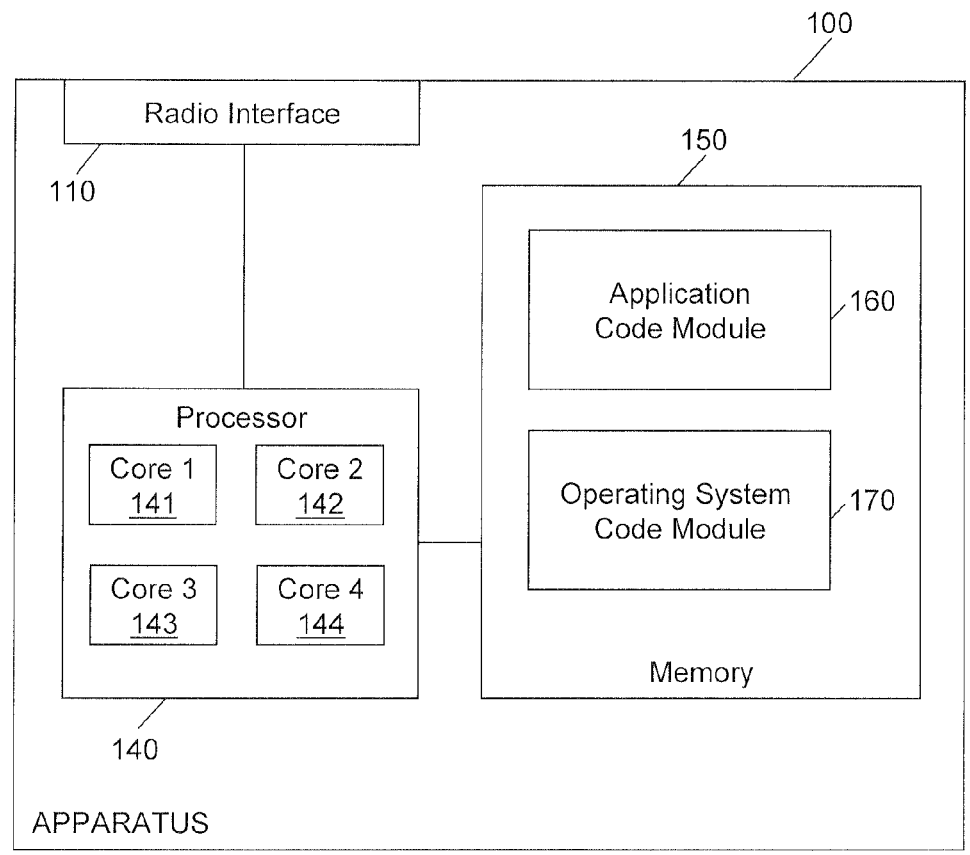
FIG. 1 schematically illustrates an apparatus according to an embodiment of the invention.

FIG. 1 schematically illustrates exemplary structures of such apparatus 100. In the example of FIG. 1, it is assumed that the apparatus is a mobile device supporting radio connectivity to a wireless network.

As illustrated, the apparatus 100 includes a radio interface 110. Further, the device 100 includes a processor 140 equipped with multiple processor cores 141, 142, 143, 144. The multi-core processor 140 is an example of the above-mentioned processor device.

Further, the apparatus includes a memory 150 coupled to the processor 140. The memory 150 includes program code modules 160, 170 with program code to be executed by the processor 140. In the illustrated example, these program code modules include an application code module 160 and an operating system code module 170.

The application code module 160 may include the program code of an application to be executed by the processor 140, such as a script based web application, e.g., based on JavaScript. The program code of the application code module 160 may also be dynamically downloaded from the Internet. The operating system code module 170 may include operating software of the apparatus, including code which controls execution of the application by the processor 140, e.g., in the form of a script execution engine. Such script execution engine may for example be part of a web browser application.

It is to be understood that the structures as illustrated in FIG. 1 are merely exemplary and that the apparatus 100 may also include other elements which have not been illustrated, e.g., structures or program code modules for implementing a user interface or other communication interfaces. Also, it is to be understood that the detailed implementation of the illustrated structures may vary. For example, the memory 150 may include a read-only-memory (ROM), a random-access memory (RAM), a flash memory, magnetic storage, or the like.

In the examples as further illustrated in the following, the processor device, e.g., the multi-core processor 140, is used for executing program code of an application, such as the web application in the application code module 160. The program code is assumed to be program code of a script-based web application, e.g., based on JavaScript. To enable transparent usage of the parallel processing capabilities of the processor device, the processor device supports Thread-Level Speculation.

The application is assumed to be event driven. When an event occurs in the application, e.g., a mouse click or other user input, such event typically corresponds to a function call. When the processor device encounters a function call in the application, it first tries to run this function in a new thread (i.e., speculates on a successful execution of the function in the new thread). If there is a conflict related to the function which is executed in the new thread, the processor device returns to a state before the speculation (i.e., performs a rollback), and re-executes the function without speculation, e.g., by executing the function in the same thread from which it was called. To enable such rollback, the processor device saves the state before the speculation. Speculations may also be nested, i.e., a function which is speculatively executed in a thread may call another function, which is speculatively executed in a still further thread.

The concepts as illustrated herein are based on the observation that for some applications, e.g., JavaScript based web applications, conflicts are very rare. For example, execution of the program code of a certain application may involve 5000 speculations of which only 3% result in a rollback. Accordingly, saving the state may not be needed for each speculation, but only for a portion of the speculations. In the illustrated concepts, this is considered by a selection performed by the processor device when starting speculative execution of the function in the new thread. In particular, the processor device decides between a first option in which the state when starting execution of the function is saved by the processor device and a second option in which the state when starting execution of the function is not saved by the processor device. Usage of the latter option allows for avoiding excessive usage of memory resources for saving information which is only potentially needed for a rollback. If a conflict occurs during speculative execution of a function, and the state when starting the speculative execution of the function was not saved due to selecting the second option, the processor device may perform the rollback to the latest saved state. As explained in more detail below, the decision between the first option and the second option may be based on a dynamically adapted heuristic. This heuristic may for example take into account the depth of the function which is called, the number of performed rollbacks, and other functions which are currently being executed by the processor device.

Figure 2:
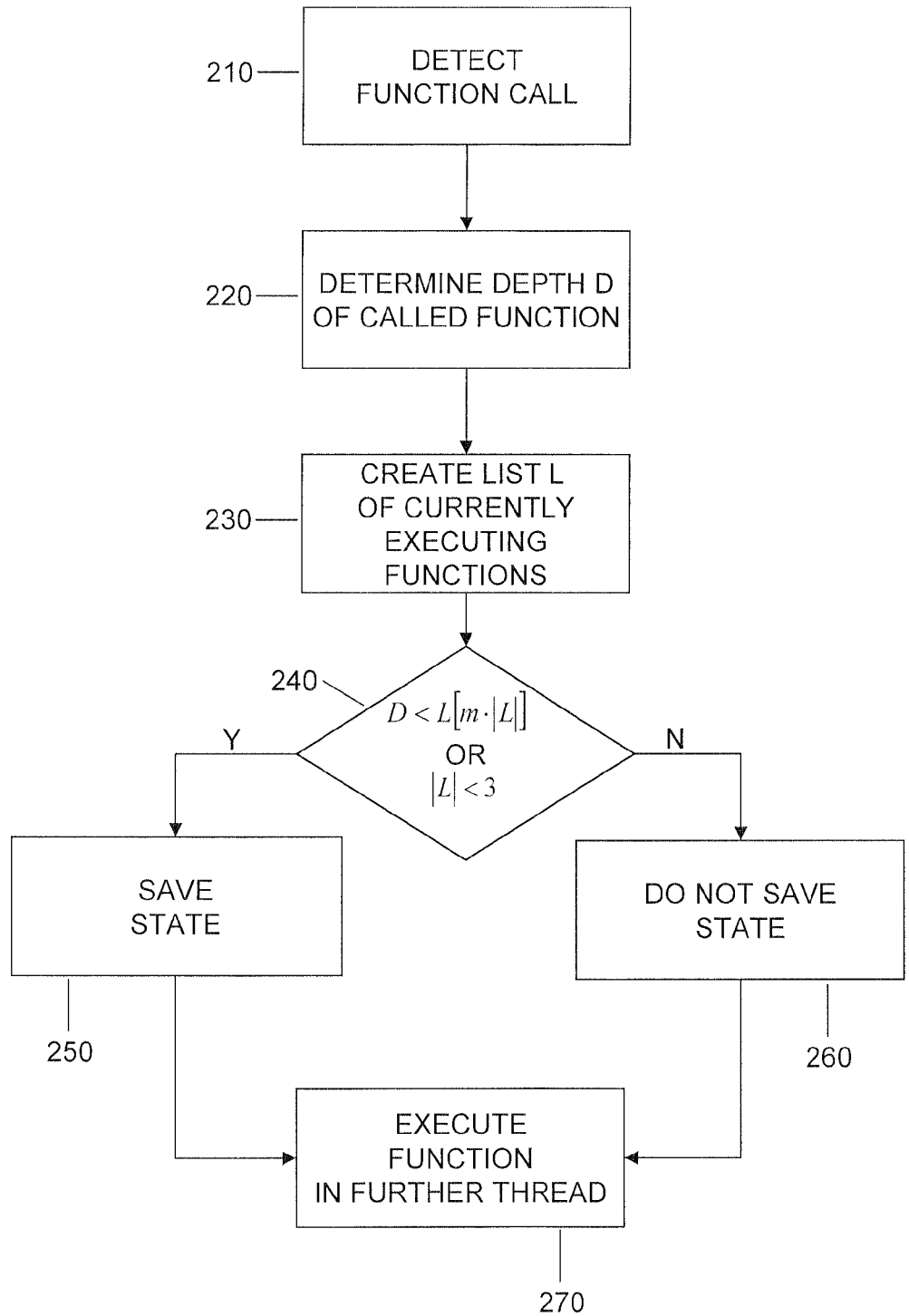
FIG. 2 shows a flowchart for illustrating a method according to an embodiment of the invention.
Figure 3:
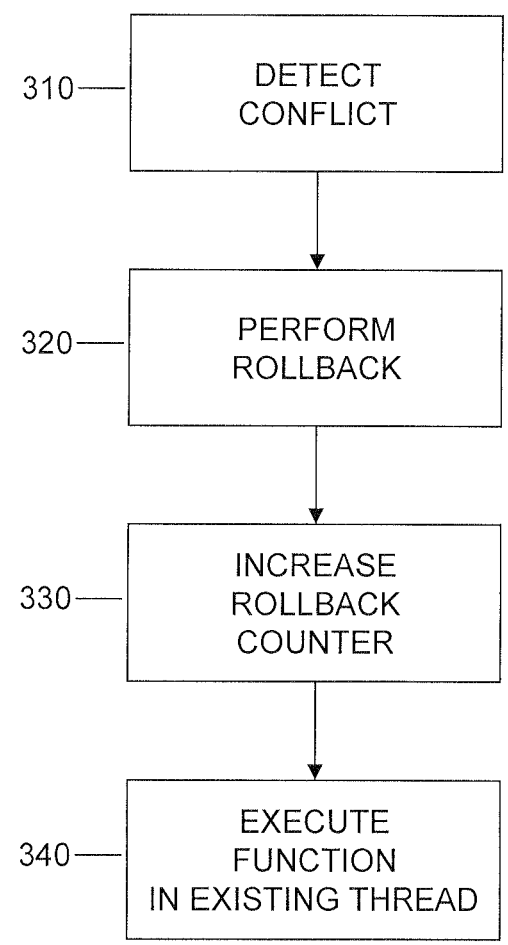
FIG. 3 shows a flowchart for illustrating further processes of a method according to an embodiment of the invention.

An exemplary implementation of the heuristic will be explained in the context of a method of executing program code as illustrated by the flowcharts of FIGS. 2 and 3.

First, before starting execution of the program code of the application, an initial value of a list position pointer m may be set, e.g., to m=0.5. Further, a rollback counter nr representing a number of rollbacks may be set to a starting value, e.g., nr=1.

If the processor device detects a call of a function, as illustrated by step 210, it may apply the following processes for selecting between the first option (saving the state) and the second option (not saving the state).

At step 220, the processor device may determine the depth D of the called function. The depth D is a parameter which reflects a level of nesting of subordinate functions which are called within a given function. For example, if no further functions are called within a given function, this function has a depth D=1. If a subordinate function is called within the function, its depth D increases by the depth of this subordinate function.

At step 230, the processor device may create a list L of the depths D of functions which are currently being executed by the processor device (in different threads). In the illustrated example, it is assumed that the list L is created in ascending order, i.e., the lowest depth D forms the start of the list L, and the other depths D follow in the order of increasing depth D. In typical scenarios, the list may also include multiple members with the same value of D.

At step 240, the processor device performs a check on the basis of the list L. In particular, the processor device may check the length of the list L, i.e., lLl. If the length lLl is less than a threshold value, e.g., of 3, the processor device continues with step 250, as indicated by branch "Y". At step 250, the processor device saves the state, i.e., selects the first option. Accordingly, for the initial function calls, e.g., the first call of a function, the state is saved. As further illustrated, the processor device may compare the depth D of the called function to the depth of further function which is currently being executed, i.e., to a depth in the list L. The depth to which the comparison is performed is at the position m·lLl in the list L, i.e., corresponds to the list member L[m·lLl]. Due to the above initial setting of the value m, this position is initially approximately in the middle of the list, typically corresponds to a medium depth value. In particular, the processor device may check whether the depth D of the called function is smaller than value of the list member L[m·lLl]. If this is the case, the processor device continues with step 250, as indicated by branch "Y". At step 250, the processor device saves the state, i.e., selects the first option. Accordingly, the state is also saved if the depth of the called function is relatively small.

Otherwise, if the length If the length lLl is equal to or larger than the threshold value, or the depth D of the called function is equal to or larger than value of the list member L[m·lLl], the processor device continues with step 260, as indicated by branch "N". At step 260, the processor device does not save the state, i.e., selects the second option.

At step 270, the processor device executes the called function in a further thread, i.e., performs a Thread-Level Speculation for the function.

As mentioned above, the Thread-Level Speculation may result in a conflict related to the execution of the function in the further thread. Exemplary processes which may be applied when such conflict occurs are illustrated by the flowchart of FIG. 3.

At step 310, the processor detects the conflict related to the speculative execution of the function in the further thread.

At step 320, in response to detecting the conflict, the processor device performs the rollback to the latest stored state. If the state was saved when starting the speculative execution of the function in the further thread, the rollback is performed to this state. Otherwise, the rollback is performed to an earlier stored state.

In response to the rollback, the processor device increments the rollback counter at step 330, i.e., increases nr to nr+1. Further, the processor device increments the list position pointer m. This is accomplished by an increment value which depends on the rollback counter. In the illustrated example, the list position pointer m is assumed to be increased according to:

$$m:=m+1/2^{nr+1}.$$

That is to say, with increasing number of rollbacks nr, the list position pointer m moves towards the end of the list L, i.e., towards higher depths. This means that the likelihood of selecting the first option at step 240 of FIG. 2 increases as rollbacks occur, thereby allowing for more efficient handling of the rollbacks. On the other hand, if no rollbacks occur a certain likelihood of selecting the second option at step 240 is maintained, thereby allowing for avoiding excessive memory usage due to the saving of states.

As can be seen, the concepts as explained above allow for efficiently executing program code in multiple threads. Due to the usage of Thread-Level Speculation, this may be accomplished in a manner which is transparent to the developer of the program code. On the other hand, excessive usage of memory resources for enabling rollbacks is avoided.

It is to be understood that the concepts as explained above are susceptible to various modifications. For example, the illustrated heuristic may be modified in various ways. By way of example, instead of sorting the list L in ascending order, the list could be sorted in descending order, and the list position pointer decremented instead of incremented. Further, the concepts could be applied in various kinds of apparatuses, e.g., in stationary computer systems. Further, the concepts are not limited to a specific processor implementation. Still further, the concepts may be used in connection with various types programming languages.

The invention claimed is:
1. A method, comprising:
a processor device executing program code in one or more threads,
the processor device detecting a call of a function in one of the one or more threads;
the processor device executing the function in a further thread;
the processor device determining a plurality of functions which are currently being executed by the processor device;
the processor device creating a sorted list of depths of the plurality of functions;
the processor device selecting a depth from the sorted list of depths depending on its position in the sorted list of depths,
wherein, as a number of performed rollbacks to a last saved state of the processor device increases, the position moves towards an end of the sorted list of depths which corresponds to higher depths; and
the processor device performing a selection between saving a state of the processor device when starting execution of the function in the further thread and not saving the state of the processor device when starting execution of the function in the further thread, wherein the selection depends on a comparison of a depth of the function to the depth selected from the sorted list of depths.

2. The method according to claim 1,
in response to a conflict related to said execution of the function in the further thread, performing a rollback to the last saved state of the processor device and executing the function in the thread in which it was called.

3. The method according to claim 2, wherein said selection depends on a number of performed rollbacks.

4. The method according to claim 1, wherein said selection depends on a number of functions which are currently being executed by the processor device.

5. The method according to claim 4,
in response to said number of functions being smaller than a threshold value, the processor device selecting said saving of the state; and
in response to said number of functions being equal to or larger than the threshold value, the processor device selecting said not saving of the state.

6. The method according to claim 5,
wherein said threshold value is 3.

7. The method according to claim 1,
wherein said selection depends on a depth of the function.

8. The method according to claim 1,
in response to a conflict related to said execution of the function in the further thread, performing a rollback to the last saved state of the processor device and executing the function in the thread in which it was called; and
wherein said position in the sorted list of depths depends on a number of performed rollbacks.

9. The method according to claim 1, comprising:
in response to the depth of the function being smaller than the depth selected from the sorted list of depths, the processor device selecting said saving of the state; and
in response to the depth of the function being equal to or larger than the depth selected from the sorted list of depths, the processor device selecting said not saving of the state.

10. The method according to claim 1,
wherein said program code is a script-based web application.

11. An apparatus, comprising:
a memory operable to store program code; and
a processor device operable to execute the program code in one or more threads; wherein the processor device is configured to:
detect a call of a function in one of the one or more threads,
execute the function in a further thread,
determine a plurality of functions which are currently being executed by the processor device;
create a sorted list of depths of the plurality of functions;
select a depth from the sorted list of depths depending on its position in the sorted list of depths,
wherein, as a number of performed rollbacks to a last saved state of the processor device increases, the position moves towards an end of the sorted list of depths which corresponds to higher depths; and
perform a selection between saving a state of the processor device when starting execution of the function in the further thread and not saving the state of the processor device when starting execution of the function in the further thread,
wherein the selection depends on a comparison of a depth of the function to the depth selected from the sorted list of depths.

12. The apparatus according to claim 11, wherein the processor device is configured to:
in response to a conflict related to said execution of the function in the further thread, perform a rollback to the last saved state of the processor device and execute the function in the thread in which it was called.

13. The apparatus according to claim 12, wherein said selection depends on a number of performed rollbacks.

14. The apparatus according to claim 11, wherein said selection depends on a number of functions which are currently being executed by the processor device.

15. The apparatus according to claim 14, wherein said processor device is configured to:
in response to said number of functions being smaller than a threshold value, select said saving of the state, and
in response to said number of functions being equal to or larger than the threshold value, select said not saving of the state.

16. The apparatus according to claim 11, wherein said selection depends on the depth of the function.

17. The apparatus according to claim 11, wherein the processor device is configured to:
in response to a conflict related to said execution of the function in the further thread, perform a rollback to the last saved state of the processor device and execute the function in the thread in which it was called; and
wherein said position in the list depends on a number of performed rollbacks.

18. The apparatus according to claim 11, comprising:
wherein the processor device is configured to:
in response to the depth of the function being smaller than the depth selected from the sorted list of depths, select said saving of the state, and
in response to the depth of the function being equal to or larger than the depth selected from the sorted list of depths, select said not saving of the state.

* * * * *